(12) United States Patent
Kida (10) Patent No.: US 6,466,753 B2
(45) Date of Patent: Oct. 15, 2002

(54) IMAGE FORMING APPARATUS

(75) Inventor: Hiroshi Kida, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/764,120

(22) Filed: Jan. 19, 2001

(65) Prior Publication Data

US 2001/0009619 A1 Jul. 26, 2001

(30) Foreign Application Priority Data

Jan. 21, 2000 (JP) ........................................ 2000-013079

(51) Int. Cl.⁷ .............................................. G03G 15/00
(52) U.S. Cl. ....................... 399/107; 399/118; 358/300; 358/474
(58) Field of Search ................................ 399/107, 118, 399/177; 358/300, 474, 497

(56) References Cited

U.S. PATENT DOCUMENTS

| | | | |
|---|---|---|---|
| 4,647,178 A | * 3/1987 | Sasaki et al. | .............. 355/133 |
| 4,931,836 A | * 6/1990 | Matsushita et al. | ........... 355/66 |
| 5,971,394 A | 10/1999 | Kida et al. | |
| 6,085,063 A | * 7/2000 | Morita et al. | .................. 355/40 |
| 6,144,813 A | * 11/2000 | Koyanagi | .................. 358/474 |
| 6,185,010 B1 | * 2/2001 | Watanabe | .................. 358/442 |

FOREIGN PATENT DOCUMENTS

| | | | | |
|---|---|---|---|---|
| JP | 4105458 | | 4/1992 | |
| JP | 08339108 A | * | 12/1996 | .......... G03G/15/00 |
| JP | 915923 | | 1/1997 | |
| JP | 09142716 A | * | 6/1997 | .......... B65H/31/24 |
| JP | 9297440 | | 11/1997 | |
| JP | 11122406 A | * | 4/1999 | ............ H04N/1/00 |

\* cited by examiner

*Primary Examiner*—Robert Beatty (57) ABSTRACT

A support structure comprises a pair of mounting members and a pair of connecting members, which are joined together by a joining member. The image reading unit is mounted on the top surfaces of the mounting members. The connecting members are disposed vertically, and the respective mounting members are supported on the top ends of the connecting members in a cantilevered manner. Securing portions are formed on each of the connecting members in the vicinity of the bottom end thereof at at least two locations vertically spaced apart from each other. The support structure is integrally secured to the paper feed unit via the securing portions of the connecting members, and the image reading unit integrally moves together with the support structure according to the horizontal movement of the image forming unit and the paper feed unit. Accordingly, the image reading unit does not fall off the support structure.

14 Claims, 8 Drawing Sheets

FIG. 11

IMAGE FORMING APPARATUS

BACKGROUND OF THE INVENTION

1. Field of the Invention

The present invention relates to an image forming apparatus in which an image reading unit is disposed so that space is allowed between the image reading unit and a peripheral unit including an image forming unit.

2. Description of the Related Art

There is a strong demand for reduction of the space for installing an image reading unit in an image forming apparatus which forms an image on a recording medium such as paper in an image forming unit based on image information read from a document by the image reading unit. For this reason, there has been an image forming apparatus in which space is provided between an image reading unit and a peripheral unit including an image forming unit and a paper feed unit, which peripheral unit is disposed below the image reading unit, so that an image-recorded recording medium is discharged to the space. Such an image forming apparatus has space provided above the peripheral unit, in which a support structure is disposed to support the image reading unit.

As an image forming apparatus provided with such a support structure, for example, Japanese Unexamined Patent Publication JP-A 9-297440 (1997) discloses an image forming apparatus comprising a peripheral unit, a rack having a bottom in abutment with a floor surface, disposed separately from the peripheral unit and an image reading unit mounted on the top of the rack.

Japanese Unexamined Patent Publication JP-A 9-15923 (1997) discloses an image forming apparatus comprising a C-shaped table having upper and lower mounting supports on which upper mounting support an image reading unit is mounted and on which lower mounting support a peripheral unit is mounted.

In addition, Japanese Examined Patent Publication JPB-B2 2846435 discloses an image recording apparatus comprising an L-shaped rack which supports an image reading unit at its upper end and has a flat portion for mounting a peripheral unit, formed at its lower end.

However, in the construction disclosed in the above-cited JP-A 9-297440, since a peripheral unit is independently movable with respect to a rack on which an image reading unit is mounted, there is the problem that in a case where the image reading unit falls off the rack when the image reading unit is moving or an operator erroneously comes into contact with the rack, the image reading unit may be damaged. To prevent this problem, the rack needs to be rigidly constructed, but there is the problem that costs and installation space increase.

However, in each of the constructions disclosed in JP-A 9-15923 and JP-B2 2846435, since the peripheral unit composed of heavy units such as the image forming unit and paper feed unit is mounted on the mounting support, the mounting support needs to be fully rigidly constructed, and there is the problem that costs and installation space increase.

SUMMARY OF THE INVENTION

An object of the invention is to provide an image forming apparatus in which a support structure for supporting an image reading unit is integrally secured to a peripheral unit, whereby an image reading unit can be disposed so that space is allowed between the image reading unit and the peripheral unit without increasing costs or installation space.

The invention has the following constructions as means for solving the problems.

The invention provides an image forming apparatus comprising:

a reading unit;

a peripheral unit including an image forming unit disposed below the image reading unit;

a support structure for supporting the image reading unit spaced from a top of the peripheral unit, having a securing portion at which the support structure is integrally secured to the peripheral unit.

According to the invention, since the support structure which supports the image reading unit is integrally secured to the peripheral unit which is disposed below the image reading unit, the support structure and the image reading unit are made to move with the movement of the peripheral unit, whereby the peripheral unit is prevented from moving independently of the support structure and the image reading unit and the image reading unit can be supported via the support structure by the peripheral unit disposed below the image reading unit in a stable state. In addition, since the weight of the peripheral unit does not act on the support structure, the support structure needs only to have strength sufficient to support the image reading unit, whereby it is possible to prevent an increase in complexity of the structure of the support structure as well as an increase in the weight thereof and it is also possible to realize facilitation of transportation and reduction in cost.

In the invention it is preferable that the support structure has a vertically extending connecting-portion for supporting a mounting portion on which the image reading unit is mounted, in a vicinity of a top end thereof in a cantilevered manner, the securing portion being formed in a vicinity of a bottom end of the connecting portion.

According to the invention, the mounting portion is supported in a cantilevered manner in the vicinity of the top end of the connecting portion disposed vertically, and the securing portion is formed in the vicinity of the bottom end of the connecting portion, whereby the support structure can be constructed to have an extremely simple structure.

In the invention it is preferable that the securing portion vertically engages with a bottom of the peripheral unit.

According to the invention, since the securing portion of the support structure vertically engages with the bottom of the peripheral unit, the horizontal movement of the peripheral unit is transmitted to the support structure via the securing portion, whereby the image reading unit and the support structure can be made to move together with the peripheral unit.

In the invention it is preferable that the support structure is secured to a back of the peripheral unit via the securing portions at plural vertical positions of the support structure.

According to the invention, the securing portions of the support structure are secured to the back of the peripheral unit at plural vertical positions of the connecting portion, whereby the weight of the image reading unit is prevented from acting to be concentrated at one point on the support structure and the back of the peripheral unit and the image reading unit can be rigidly supported via the support structure by the peripheral unit.

Incidentally, in this construction, if a side which is mainly opposed by an operator during image forming processing is defined as a front side, the back of the peripheral unit indicates a side which is parallel to the front side and does not hinder the operation of the operator during image forming processing even if the securing portion of the support structure is secured to the side.

In the invention it is preferable that the support structure is secured to lateral sides of the peripheral unit via the securing portions at plural positions in a front and back direction of the supporting structure.

According to the invention, the securing portions of the support structure are secured to the lateral sides of the peripheral unit at plural positions in the front and back direction of the supporting structure, whereby the weight of the image reading unit is prevented from acting to be concentrated at one point on the support structure and the lateral sides of the peripheral unit and the image reading unit can be rigidly supported via the support structure by the peripheral unit.

Incidentally, in this construction, if a side which is mainly opposed by an operator during image forming processing is defined as a front side, the lateral sides of the peripheral unit indicate sides which are perpendicular to the front side and do not hinder the operation of the operator during image forming processing even if the securing portion of the support structure is secured.

In the invention it is preferable that the securing portion includes a spacer which is positioned between the back of the peripheral unit and the securing portion.

According to the invention, the securing portion of the support structure is secured with the spacer interposed between the back of the peripheral unit and the securing portion, whereby even if the back of the peripheral unit has a forward, backward, rightward or leftward dimensional error in the vertical direction, the connecting portion can be rectilinearly constructed.

In the invention it is preferable that the securing portion includes a spacer which is positioned between the securing portion and the lateral side of the peripheral unit.

According to the invention, the securing portion of the support structure is secured with the spacer interposed between the lateral side of the peripheral unit and the securing portion, whereby even if the lateral side of the peripheral unit has a dimensional error in the forward or backward direction, the connecting portion can be rectilinearly constructed.

In the invention it is preferable that the peripheral unit includes a paper feed unit for accommodating paper therein, and an image forming unit which is disposed above the paper feed unit, for forming an image on paper, and the support structure is secured to the paper feed unit.

According to the invention, since the image reading unit and the paper feed unit which are supported by the support structure are integrally provided, stability can be improved compared to the case in which the image reading unit and the image forming unit are integrally provided and mounted on the paper feed unit.

In the invention it is preferable that the peripheral unit includes a caster provided with a roller capable of rolling, and a stand displaceable between a position where the stand projects from the caster and a position where the stand is retracted from the caster.

According to the invention, by retracting the stand from the caster, it is possible to easily move the image forming apparatus by means of the caster, whereas by projecting the stand from the caster, it is possible to prevent undesirable movement of the image forming apparatus and install the image forming apparatus at a predetermined position.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
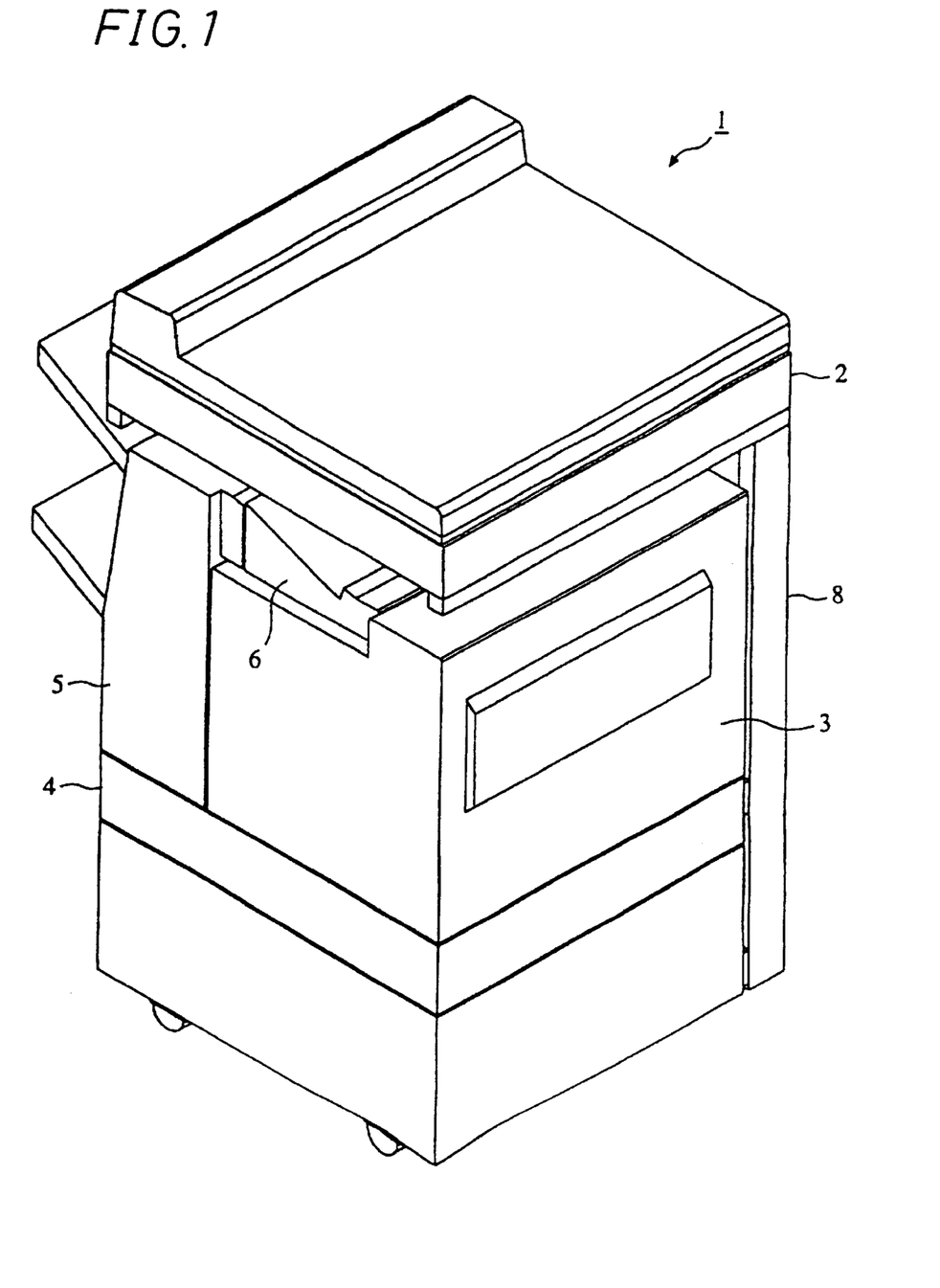
FIG. 1 is a diagrammatic view showing the construction of an image forming apparatus according to an embodiment of the invention.

FIG. 1 is a diagrammatic view showing the construction of an image forming apparatus 1 according to an embodiment of the invention. The image forming apparatus 1 is constructed in such a manner that an image reading unit 2, an image forming unit 3 and a paper feed unit 4 are arranged in that order from above downwardly. This image forming apparatus 1 is fitted with a postprocessing unit 5 and a paper supply unit 6, and further, is selectively fitted with a double-sided paper feed unit 7 (not shown). The image forming unit 3 is disposed on the paper feed unit 4, and the bottom of the image forming unit 3 contacts with the top of the paper feed unit 4. The image reading unit 2 is arranged above the image forming unit 3 so that predetermined space is allowed between the image reading unit 2 and the image forming unit 3 by means of a support structure 8. The image forming unit 3, the paper feed unit 4, the postprocessing unit 5, the paper supply unit 6 and the double-sided paper feed unit 7 constitute a peripheral unit of the invention. However, the postprocessing unit 5, the paper supply unit 6 and the double-sided paper feed unit 7 are not necessarily needed, and the construction of the peripheral unit is not limited to such combination.

Figure 2:
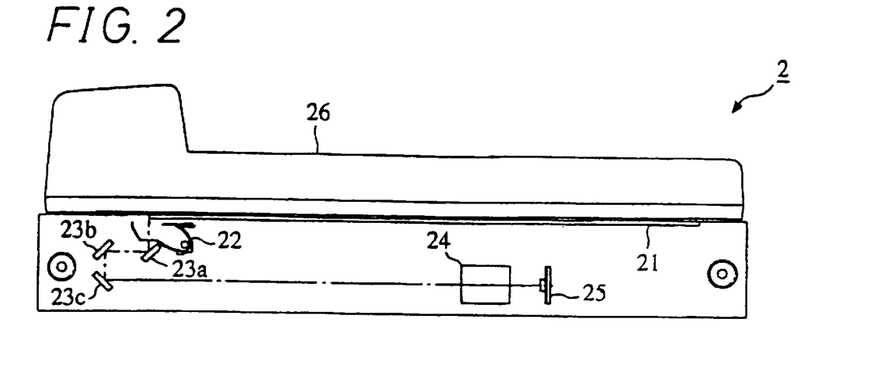
FIG. 2 is a diagrammatic front view, partly in cross section, showing the construction of an image reading unit of the image forming apparatus.

FIG. 2 is a diagrammatic front view, partly in cross section, showing the construction of the image reading unit 2 of the image forming apparatus 1. The image reading unit 2 reads image information from an image plane of a document. For this reason, the image reading unit 2 is provided with a document table 21, a light source lamp 22, mirrors 23a to 23c, a lens 24, a photoelectric conversion element (hereinafter referred to as a CCD) 25 and an automatic document feeder (hereinafter referred to as an ADF) 26. The document table 21 is made of a plate-shaped transparent hard glass, and a document is disposed on the top of the document table 21. The light source lamp 22 reciprocally moves in parallel with the document table 21 together with the mirrors 23a to 23c, and scans and exposes the whole of the image plane of the document disposed on the document table 21. The mirrors 23a to 23c transmit to the lens 24 light which is emitted from the light source lamp 22 and reflected from the image plane of the document. Incidentally, in order to keep constant the optical path length from the image plane of the document to the photosensitive surface of the CCD 25, the moving speed of each of the mirrors 23b and 23c is made ½ of the moving speed of the light source lamp 22 and the mirror 23a.

The lens 24 focuses the light reflected from the image plane of the document onto the photosensitive surface of the CCD 25. The CCD 25 outputs an electrical signal which corresponds to the amount of light received by the photosensitive surface. The output signal of the CCD 25 is subjected to image processing after A/D conversion in an image processing part (not shown), and is supplied as image data to the image forming unit 3 which will be described later. The ADF 26 openably and closably covers the top of the document table 21, and supplies a document to the top of the document table 21 on a sheet-by-sheet basis. As this ADF 26, it is also possible to use a device which has the document reverse transport function of reversing upside down a document from one side of which an image has been read, and again transporting the document to the document table 21.

Figure 3:
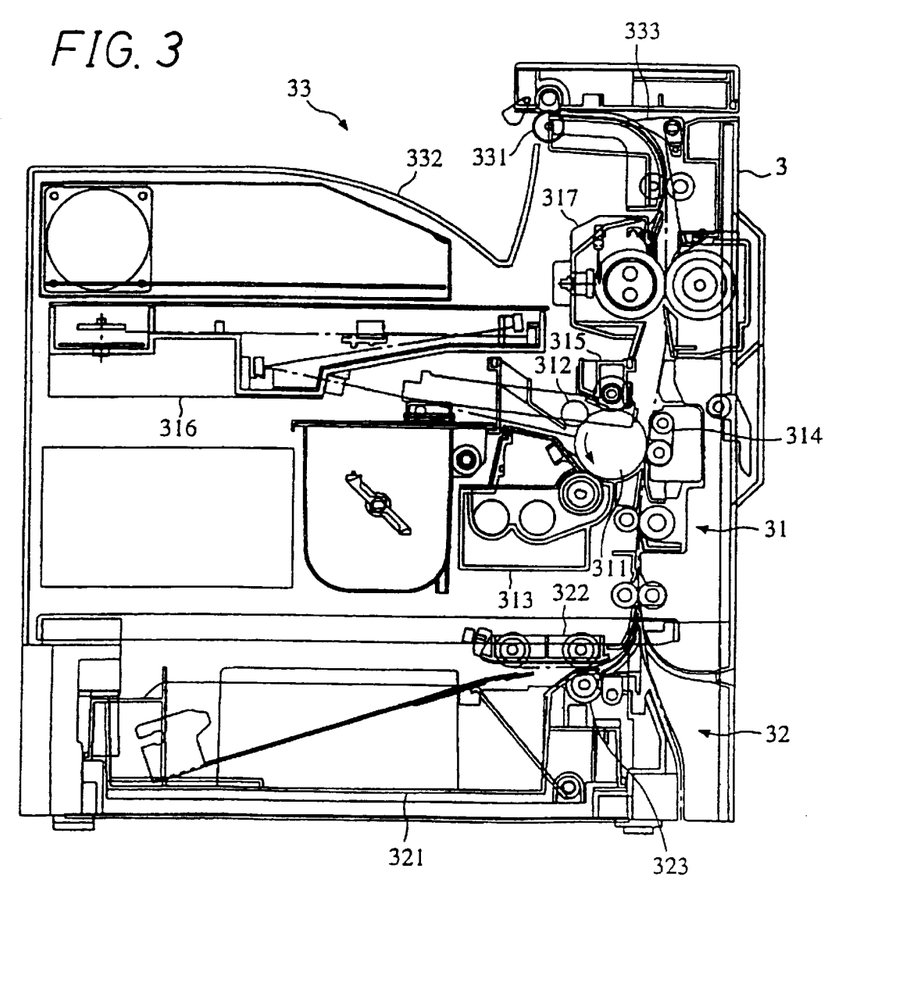
FIG. 3 is a front cross-sectional view showing the construction of the image forming unit of the image forming apparatus.

FIG. 3 is a front cross-sectional view showing the construction of the image forming unit 3 of the image forming apparatus 1. The image forming unit 3 is made of a process part 31, a feeding part 32 and a delivery part 33, and forms an image on paper on the basis of image data read by the image reading unit 2. The process part 31 has a charge roller 312, a development unit 313, a transfer unit 314 and a cleaner 315 all of which are disposed around a photoconductive drum 311, and further has a scan unit 316 and a fixing unit 317. The photoconductive drum 311 rotates in the direction of an arrow during an image forming process, and after charges of the same polarity have been uniformly placed on the surface of the photoconductive drum 311 on which a photoconductive layer is formed, by the charge roller 312, the surface is exposed by image light such as laser light modulated by image data from the scan unit 316.

An electrostatic latent image is formed on the surface of the photoconductive drum 311 which has been exposed by the image light, by the action of photoconduction. A developer is supplied from the development unit 313 to the surface of the photoconductive drum 311 on which the electrostatic latent image has been formed, and this developer is selectively electrostatically adsorbed onto the surface of the photoconductive drum 311, whereby the electrostatic latent image is developed into a developer image. The developer image formed on the surface of the photoconductive drum 311 is transferred to a surface of paper, and the paper to which the developer image has been transferred is exposed to heat and pressure by the fixing unit 317. Thus, the developer image is melted and firmly fixed to the surface of the paper.

The feeding part 32 is provided with a paper feed cassette 321, a supply roller 322 and a separating unit 323, and feeds paper to the process part 31 on a sheet-by-sheet basis. The paper feed cassette 321 accommodates plural sheets of paper of the same size, and urges the top surface of paper located at the uppermost position against the periphery of the supply roller 322. The supply roller 322 rotates prior to the rotation of the photoconductive drum 311 in the process part 31, and causes only one sheet of paper to pass between the supply roller 322 and the separating unit 323. The paper which is fed on a sheet-by-sheet basis by the supply roller 322 and the separating unit 323 is carried to the gap between the photoconductive drum 311 and the transfer unit 314 in synchronism with the rotation of the photoconductive drum 311 in the process part 31. Incidentally, if paper is to be loaded into the paper feed cassette 321, the paper feed cassette 321 is drawn forwardly from the image forming unit 3.

The delivery part 33 is provided with a delivery roller 331, a delivery tray 332 and a flapper 333, and accommodates image-formed paper at the outside of the apparatus in an orderly state. Specifically, paper which has a developer image fixed to its surface through the fixing unit 317 is delivered to the delivery tray 332 by the rotation of the delivery roller 331. Incidentally, in the image forming apparatus 1 according to this embodiment, the paper feeding unit 6 which will be described later is fitted to the delivery tray 332. Accordingly, the delivery roller 331 transports the paper which has passed through the fixing unit 317, into the paper feeding unit 6. The flapper 333 will be described later.

Figure 4:
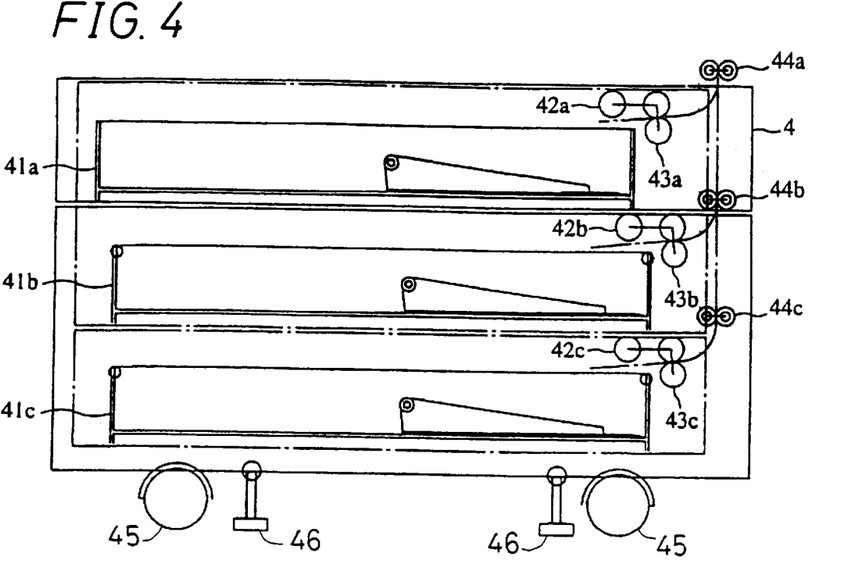
FIG. 4 is a front cross-sectional view showing the construction of a paper feed unit of the image forming apparatus.

FIG. 4 is a front cross-sectional view showing the construction of the paper feed unit 4 of the image forming apparatus 1. The paper feed unit 4 feeds paper accommodated in its inside to the process part 31 of the image forming unit 3 on a sheet-by-sheet basis. For this reason, as one example, the paper feed unit 4 accommodates three stacked paper feed cassettes 41a to 41c. These paper feed cassettes 41a to 41c can accommodate paper of sizes larger than can the paper feed cassette 321 provided in the feeding part 32 of the image forming unit 3, and each of the paper feed cassettes 41a to 41c accommodates plural sheets of paper of one particular size. The paper feed unit 4 is provided with supply rollers 42a to 42c, separating rollers 43a to 43c, and transport rollers 44a to 44c for the respective paper feed cassettes 41a to 41c.

When paper accommodated in any of the paper feed cassettes 41a to 41c is selected as a target on which an image is to be formed, particular rollers are rotated to feed the selected paper on a sheet-by-sheet basis, which rollers correspond to the selected paper accommodated in any of the paper feed cassettes 41a to 41c from among the supply rollers 42a to 42c, the separating rollers 43a to 43c and the transport rollers 44a to 44c. The paper fed from any of the paper feed cassettes 41a to 41c is carried to the gap between the photoconductive drum 311 and the transfer unit 314 through the feeding part 32 of the image forming unit 3.

Incidentally, the number of paper feed cassettes in the paper feed unit 4 is not limited to three.

Casters 45 and stands 46 are disposed at the bottom of the paper feed unit 4. Each of the casters 45 includes, for example, a wheel, an axle and a rotating shaft. A pair of wheels are fitted to the opposite ends of the axle, respectively. The rotating shaft is positioned perpendicularly to the axle. Each of the casters 45 is secured so that the rotating shaft is perpendicular to the bottom of the paper feed unit 4. The respective casters 45 are secured near the four corners of the bottom. The respective wheels of the casters 45 are rotatable about the rotating shafts perpendicular to the bottom of the paper feed unit 4 and are rotatable about the axles perpendicular to the respective rotating shafts, whereby the paper feed unit 4 is supported for movement with respect to a floor surface by the casters 45.

Each of the stands 46 has, for example, an abutment part and a screw member. The screw member has an approximately cylindrical shape, and an external thread is formed around its outer periphery. The abutment part has an approximately disk-like shape, and one axial end surface of the screw member is joined to the center of one surface of the abutment part so that the end surface of the abutment part is perpendicular to the axis of the screw member.

In the vicinity of a location where each of the casters 45 is secured, a threaded hole in which an internal thread is formed is opened in the bottom of the paper feed unit 4, and the threaded hole is formed so that its axis is perpendicular to the bottom of the paper feed unit 4. The respective screw members of the stands 46 are screwed into the threaded holes, whereby the stands 46 are secured to the paper feed unit 4. Each of the stands 46 is screwed forward and backward by being turned about the axis of its screw member. When the respective stands 46 are screwed backward until the abutment parts come into abutment with the floor surface and the stands 46 are disposed at positions where the casters 45 are disposed at positions apart from the floor surface, whereby the paper feed unit 4 is prevented from moving with respect to the floor surface by the stands 46 and the paper feed unit 4 is placed in position. When the stands 46 are screwed forward to move the abutment parts thereof away from the floor surface until the stands 46 are disposed at positions where the casters 45 are brought into abutment with the floor surface, the paper feed unit 4 becomes movable with respect to the floor surface. The stands 46 can be stably placed in position even on an uneven floor surface by the stands 46.

The constructions of the casters 45 and the stands 46 are not limited to the above-described examples. Each of the casters 45 may be of any type of construction provided with a rolling member which can freely roll with respect to a plane where the image forming apparatus 1 is installed, for example, the floor surface, and a spherical ball may also be used in place of a wheel as such a rolling member. The stands 46 may be of any type of construction in which the abutment parts to come into abutment with a plane where the image forming apparatus 1 is installed can be displaced between a position where the abutment parts are projected from the casters 45 and a position where the abutment parts are retracted from the casters 45.

A member which restricts at least the horizontal movement of the mounted image forming unit 3 is formed on the top of the paper feed unit 4. Accordingly, the image forming unit 3 does not move in a horizontal direction in the state of being independent from the paper feed unit 4.

Figure 5:
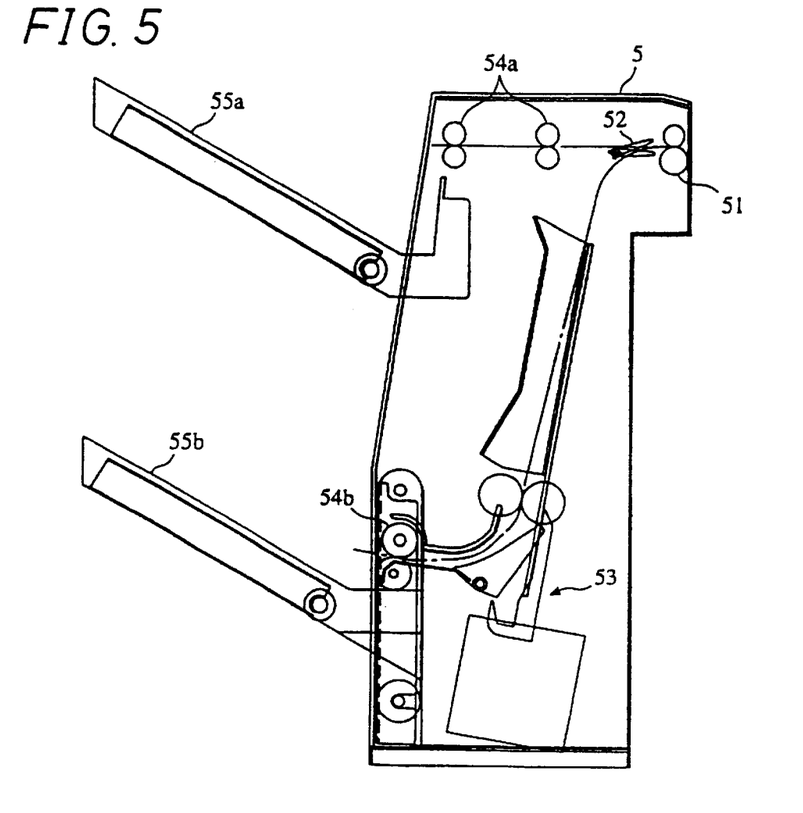
FIG. 5 is a front cross-sectional view showing the construction of a postprocessing unit of the image forming apparatus.

FIG. 5 is a front cross-sectional view showing the construction of the postprocessing unit 5 of the image forming apparatus 1. The postprocessing unit 5 fitted to one side of the image forming unit 3 has an introducing roller 51, a flapper 52, a postprocessing mechanism 53, delivery rollers 54a and 54b and delivery trays 55a and 55b, and selectively executes postprocessing such as stapling or punching of image-formed paper which is delivered to the delivery part 33. The introducing roller 51 is supplied with image-formed paper from the paper feeding unit 6 fitted to the delivery part 33 of the image forming unit 3, and introduce the image-formed paper into the postprocessing unit 5. The flapper 52 guides the image-formed paper to either the delivery rollers 54a or the postprocessing mechanism 53 in accordance with a selection made by an operator. In the case where the operator instructs the image forming apparatus 1 to execute postprocessing, the postprocessing mechanism 53 temporarily stores a predetermined number of sheets of image-formed paper, and performs the postprocessing on the image-formed paper and delivers the postprocessed paper to the delivery tray 55b via the delivery roller 54b. In the case where the operator does not instruct the image forming apparatus to execute postprocessing, the image-formed paper is delivered to the delivery tray 55b via the delivery roller 54a.

Figure 6:
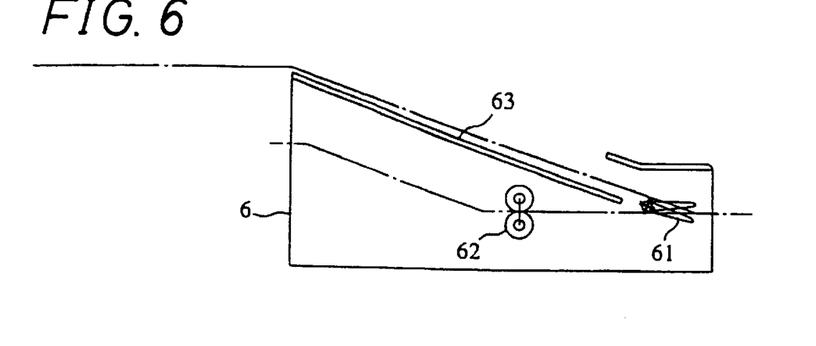
FIG. 6 is a front cross-sectional view showing the construction of a paper feeding unit of the image forming apparatus.

FIG. 6 is a front cross-sectional view showing the construction of the paper feeding unit 6 of the image forming apparatus 1. The paper feeding unit 6 which is selectively fitted to the delivery part 33 of the image forming unit 3 has a flapper 61, a supply roller 62 and a switchback tray 63. The paper feeding unit 6 selectively supplies to the postprocessing unit 5 image-formed paper delivered by the delivery roller 331 of the image forming unit 3, and during double-sided image formation mode, reverses the direction of transport of paper having an image formed on one side and introduces the reversed paper into the image forming unit 3. The flapper 61 guides the image-formed paper delivered from the image forming unit 3 to either of the supply roller 62 and the switchback tray 63.

Specifically, the flapper 61 guides paper having an image formed on one side to the supply roller 62 during single-sided image formation mode for forming an image on one side of paper, or paper having images formed on both sides to the supply roller 62 during the double-sided image formation mode for forming images on both sides of paper. Then, the paper which has thus been subjected to image formation processing in the single-sided image formation mode or the double-sided image formation mode is supplied to the postprocessing unit 5 via the supply roller 62. The flapper 61 guides to the switchback tray 63 the paper having an image formed on one side during the double-sided image formation mode. During the double-sided image formation mode in which image forming processing is performed on the observe and reverse sides of one sheet of paper twice in total, the delivery roller 331 of the image forming unit 3 reverses its rotating direction before the trailing edge of the paper passes the delivery roller 331 after the trailing edge has passed the flapper 333 upon the completion of the first cycle of image forming processing. Thus, the single-sided image formed paper is returned to the image forming unit 3 in the state of being reversed in its transport direction. During this time, before the delivery roller 331 reverses the rotating direction, part of the paper which has passed the delivery roller 331 is guided to the switchback tray 63 by the flapper 61.

Incidentally, even in the case where the paper feeding unit 6 is not fitted to the image forming unit 3, the transport direction of the paper is reversed by the control of the rotating direction of the delivery roller 331, whereby image forming processing can be executed in the double-sided image formation mode. The paper feeding unit 6, therefore, is not an element indispensable to the double-sided image formation mode. However, in the case where postprocessing is performed on paper in the postprocessing unit 5, there is a need for the paper feeding unit 6 which provides communication between the delivery roller 331 of the image forming unit 3 and the flapper 61 of the paper feeding unit 6, and the paper feeding unit 6 is an element indispensable to postprocessing.

Figure 7:
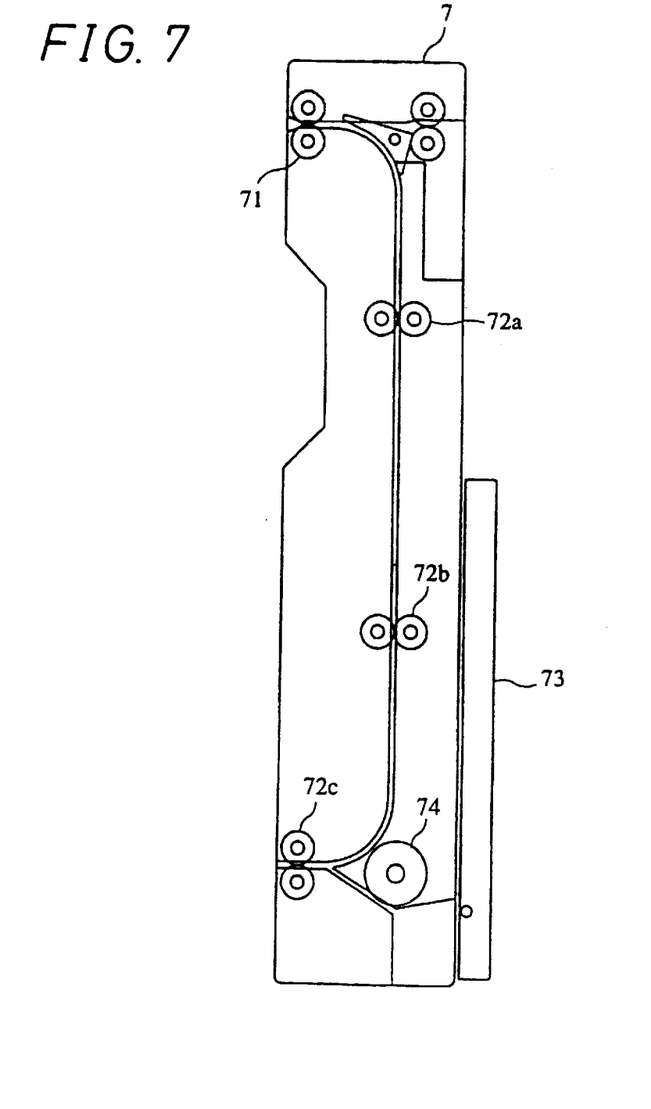
FIG. 7 is a front cross-sectional view showing the construction of a double-sided paper feed unit of the image forming apparatus.

FIG. 7 is a front cross-sectional view showing the construction of the double-sided paper feed unit 7 of the image forming apparatus 1. The double-sided paper feed unit 7 which is selectively fitted to the other side of the image forming unit 3 has an introducing roller 71, transport rollers 72a to 72c, a manual feed tray 73 and a feed roller 74. The double-sided paper feed unit 7 again feeds to the process part 31 paper having an image formed on one side during the double-sided image formation mode, and feeds to the process part 31 manual feed paper which is fed in the manual feed tray 73. The introducing roller 71 introduces into the double-sided paper feed unit 7 the paper which has been returned to the image forming unit 3 by the delivery roller 331 which has reversed in its rotating direction during the double-sided image formation mode. Incidentally, at the same time that the delivery roller 331 reverses in the rotating direction, the flapper 333 swings to open a transport path which extends from the delivery roller 331 toward the introducing roller 71. The transport rollers 72a to 72c transport the introduced paper having an image formed on one side into the feeding part 32 of the image forming unit 3. Thus, the single-sided image formed paper is guided to the gap between the photoconductive drum 311 and the transfer unit 314 in the state of being reversed upside down, and images are formed on both sides of the paper.

To the manual feed tray 73 is manually fed paper independently of the paper accommodated in the paper feed cassette 321 and the paper feed cassettes 41a to 41c. The feed roller 74 feeds the manual feed paper loaded in the manual feed tray 73 to the feeding part 32 on a sheet-by-sheet basis.

Figure 8:
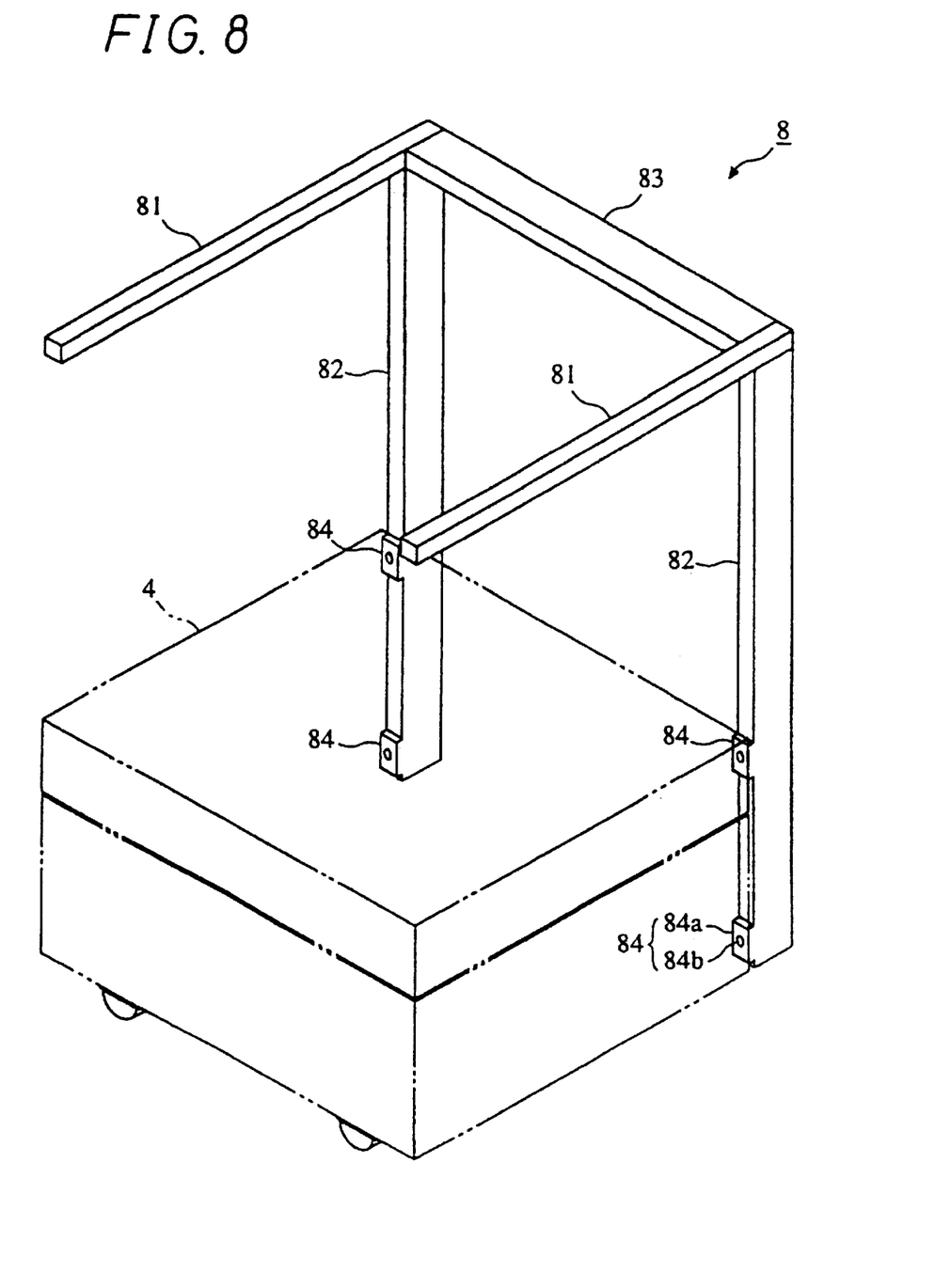
FIG. 8 is a perspective view showing the construction of a support structure of the image forming apparatus.

FIG. 8 is a perspective view showing the construction of the support structure 8 of the image forming apparatus 1. The support structure 8 is constructed in such a manner that a pair of mounting members 81 and a pair of connecting members 82 are joined together by a joining member 83. The mounting members 81 are bar-like members which are rectangular in cross section and are disposed horizontally, and the image reading unit 2 is mounted on the top surfaces of the mounting members 81. Incidentally, the mounting members 81 may also be provided with a member which restricts at least the horizontal movement of the image reading unit 2 with respect to the mounting members 81. The connecting members 82 are bar-like members which are rectangular in cross section and are disposed vertically, and the back-side surface of each of the mounting members 81 is secured at one end to the top end of the corresponding one of the connecting members 82. In this manner, the respective mounting members 81 are supported on the top ends of the connecting members 82 in a cantilevered manner. In addition, securing portions 84 are formed on each of the connecting members 82 in the vicinity of the bottom end thereof at at least two locations vertically spaced apart from each other.

Each of the connecting members 82 is secured via the securing portions 84 to the back of the paper feed unit 4 which constitutes the peripheral unit. The joining member 83 is a bar-like member which is rectangular in cross section and are disposed horizontally, and in the example shown in FIG. 8, both ends of the joining member 83 are respectively secured to the inside surfaces of the pair of mounting members 81 and the top surface of the joining member 83 is in flush with the top surface of the mounting members 81. Accordingly, the image reading unit 2 is disposed in abutment with the top surfaces of the mounting members 81 and the joining member 83.

Each of the mounting members 81 and the adjacent one of the connecting members 82 are disposed perpendicularly to each other, and are joined together at their ends to form an L-like shape. Moreover, the pair of mounting members 81 are disposed in parallel with each other, and the pair of connecting members 82 are disposed in parallel with each other, and both ends of the joining member 83 which is disposed perpendicular to each of the mounting members 81 and to each of the connecting members 82 are respectively joined to the portions of the mounting members 81 that are joined to the respective connecting members 82. Since the support structure 8 is constructed in this manner and the image reading unit 2 is disposed on the mounting members 81 and the joining member 83, the load of the image reading unit 2 is distributed so that the image reading unit 2 can be suitably supported.

In addition, in the case where the image reading unit 2 is connected to the peripheral unit by using the support structure 8, the support structure 8 is connected to the paper feed unit 4 which is disposed at the lowest position in the peripheral unit, whereby the stability of the image forming apparatus 1 can be improved. If the support structure 8 is connected to the image forming unit 3 on the paper feed unit 4, a construction in which the image forming unit 3 and the image reading unit 2 are integrally combined with each other is disposed on the paper feed unit 4, so that a construction having its center of gravity at a high position unstably lies on the paper feed unit 4. In contrast, in the invention, it is possible to improve the stability by making the center of gravity as low as possible.

Incidentally, both ends of the joining member 83 may be secured to the pair of connecting members 82, respectively. Otherwise, the mounting members 81 and the connecting members 82 may be integrally constructed.

Each of the securing portions 84 is made of a spacer portion 84a which projects from the front surface of the corresponding one of the connecting members 82 (the surface of the corresponding one of the connecting members 82 that is opposed to the back of the paper feed unit 4) and a through-hole 84b which extends through the corresponding one of the connecting members 82 between the back and front surfaces thereof at a position where the spacer portion 84a is formed. Securing screws (not shown) inserted through the respective through-holes 84b from the back sides thereof are screwed into threaded holes formed in the back of the paper feed unit 4, whereby the support structure 8 is integrally secured to the paper feed unit 4 via the securing portions 84 formed on each of the connecting members 82. The spacer portions 84a form predetermined space (suitably, approximately 10 mm) between the front surfaces of the connecting members 82 and the back of the paper feed unit 4 as well as the back of the image forming unit 3 disposed on the paper feed unit 4.

Accordingly, in the case where the back of the image forming unit 3 and the back of the paper feed unit 4 have more or less error in the forward or backward direction, or even in the case the connecting members 82 are secured to the back of the paper feed unit 4 in the state where their top ends are inclined toward the front side, the image forming unit 3 can be disposed on the top of the paper feed unit 4 to the back of which the connecting members 82 are secured. Moreover, since space is formed between the connecting members 82 and the image forming unit 3 disposed on the paper feed unit 4, the back cover of the image forming unit 3 can be removed with the need to move the image forming unit 3 from the top of the paper feed unit 4, whereby it is possible to facilitate maintenance work.

However, in the case where no forward or backward error occurs between the back of the image forming unit 3 and the back of the paper feed unit 4, the spacer portions 84a can be omitted. Otherwise, the spacer portions 84a may be prepared as spacers constructed separately from the connecting members 82, and in the case where the connecting members 82 are secured to the back of the paper feed unit 4, such spacers may be interposed between the connecting members 82 and the paper feed unit 4 to surround the respective through-holes 84b.

In addition, since the securing portions 84 are formed on each of the connecting members 82 at plural upward and downward positions thereof, the load of the image reading unit 2 which is disposed on the top surfaces of the mounting members 81 and the joining member 83 is prevented from acting to be concentrated at one point on any of the connecting members 82 and the back of the paper feed unit 4, whereby it is possible to prevent damage to the securing portions 84 of the connecting members 82 as well as damage to the back of the paper feed unit 4.

Moreover, since members which constitute the support structure 8 are not present on the front side of the image reading unit 2, the image forming unit 3 nor the paper feed unit 4, there is no risk of hindering paper loading work to be performed at the front side of the image forming apparatus 1. In addition, since members which constitute the support structure 8 are not present on either of the lateral sides of the image forming unit 3, there is no risk of hindering the work of fitting the postprocessing unit 5 and the double-sided paper feed unit 7 to the side of the image forming unit 3 or the work of handling image-formed paper.

Incidentally, the mounting members 81, the connecting members 82 and the joining member 83 can be made hollow on condition that all of the members 81, 82 and 83 have enough strength to hold the image reading unit 2. In this case, the support structure 8 can be reduced in weight. In addition, the connecting members 82 may be made rectangular in cross section and one shorter side of each of the connecting members 82 may be disposed to oppose the back of the paper feed unit 4 so that the connecting members 82 can be reduced in cross section.

In addition, the securing portions 84 are not limited to the structure in which the securing portions 84 are secured to the back of the paper feed unit 4 by the securing screws. For example, the respective securing portions 84 may be fitted from above into recesses which are formed in the back of the paper feed unit 4.

According to the above-described construction, in the image forming apparatus 1 according to this embodiment, the image reading unit 2 is supported by the support structure 8 integrally secured to the back of the paper feed unit 4 via the securing portions 84, and the image forming unit 3 to which the postprocessing unit 5, the paper feeding unit 6 and the double-sided paper feed unit 7 are selectively fitted is disposed on the top of the paper feed unit 4. Accordingly, the horizontal movements of the image forming unit 3 and the paper feed unit 4 are consistently transmitted to the image reading unit 2 via the support structure 8, and the image forming unit 3 and the paper feed unit 4 are prevented from moving separately from the image reading unit 2 and the support structure 8 and the image reading unit 2 can be reliably prevented from falling off the support structure 8.

In addition, the paper feed unit 4 to which the support structure 8 are secured via the securing portions 84 is disposed at the lowest position in the image forming apparatus 1 and is constructed to accommodate paper in its inside, so that the image reading unit 2 is fully heavy compared to the image reading unit 2. Accordingly, the image reading unit 2 can be stably supported by the support structure 8.

Moreover, since the weight of the peripheral unit including the image forming unit 3 and the paper feed unit 4 does not act on the support structure 8, the support structure 8 needs only to have strength sufficient to support the image reading unit 2, whereby the structure of the support structure 8 can be made simple.

The support structure 8 is secured to the paper feed unit 4 in the state of projecting from the back of the image forming unit 3 and the back of the paper feed unit 4. When the image forming apparatus 1 is installed in proximity to a wall surface, the support structure 8 projects from the back of the image forming unit 3 and the back of the paper feed unit 4 to a greater extent than do cables which electrically connect various connectors and units disposed on the back of the image forming unit 3 and the back of the paper feed unit 4. Accordingly, the connectors and the cables do not come into contact with the wall surface, whereby the connectors and the cables are prevented from being damage by contact with the wall surface.

In addition, space is formed between the image forming unit 3 and the wall surface by the support structure 8, whereby there is no risk of blocking a vent hole through which to radiate heat generated in the image forming unit 3 disposed on the back of the image forming unit 3 and it is possible to achieve good radiation of heat from the image forming unit 3.

Figure 9:
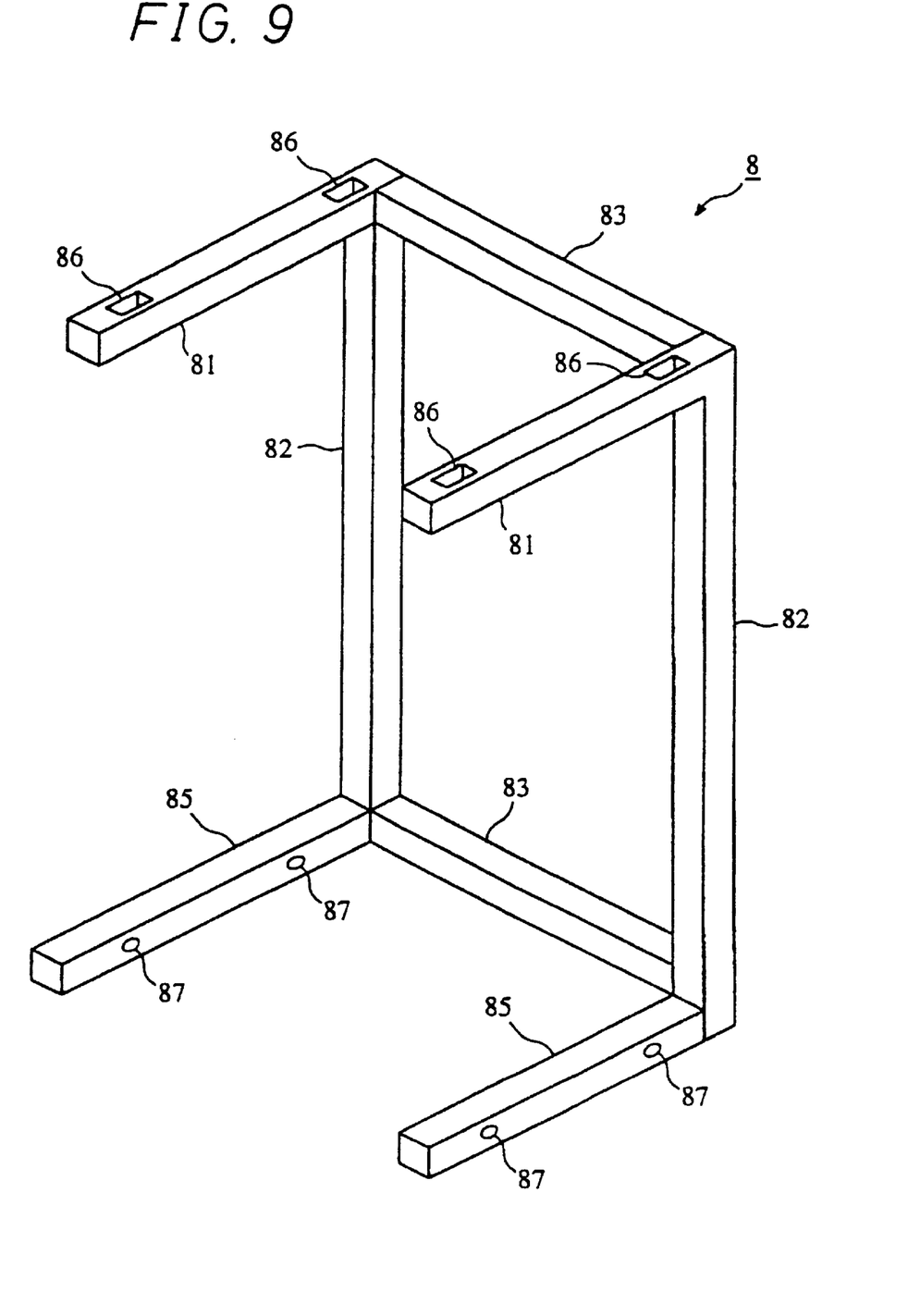
FIG. 9 is a perspective view showing the construction of a support structure of an image forming apparatus according to another embodiment of the invention.

FIG. 9 is a perspective view showing the construction of the support structure 8 of the image forming apparatus 1 according to another embodiment of the invention. In FIG. 9, identical reference numerals are used to denote portions which correspond to those of the embodiment shown in FIGS. 1 to 8, and only different portions will be described below. In the image forming apparatus 1 according to this embodiment, the support structure 8 is made of a pair of mounting members 81, a pair of connecting members 82, a pair of joining member 83 and a pair of securing members 85, each of which has a rectangular cross section. The respective securing members 85 are secured to the bottom end portions of the front sides of the connecting members 82, and the upper one of the pair of joining member 83 is secured at both ends to the top end portions of the pair of connecting members 82, while the lower one of the pair of joining member 83 is secured at both ends to the bottom end portions of the pair of connecting members 82. Fitting holes 86 are respectively formed at two forward and backward locations in the top side of each of the mounting members 81. Through-holes 87 are respectively formed in each of the securing members 85 at plural (in this example, two) forward and backward locations thereof in such a manner as to extend through each of the securing members 85 between the outside and inside surfaces thereof. The inside surface of each of the securing members 85 is brought into abutment with either of the right and left sides of the paper feed unit 4.

The respective securing members 85 are disposed in parallel with the mounting members 81, and one-side ends of the securing members 85 are respectively joined to the end portions of the connecting members 82 that are opposite to the other end portions thereof joined to the respective mounting members 81. The mounting members 81, the connecting members 82 and the securing members 85 are disposed in a C-like shape. The other (bottom-side) one of the joining members 83 used in this embodiment is disposed in parallel with the top-side joining member 83, and both ends of the bottom-side joining member 83 are respectively joined to portions at each of which either one of the connecting members 82 is joined to the corresponding one of the securing members 85.

Projecting pieces which are formed on the bottom of the image reading unit 2 are fitted from above into the respective fitting holes 86 formed in the top sides of the mounting members 81 of the support structure 8 constructed in this manner. Owing to this fitting, the horizontal movement of the image reading unit 2 with respect to the mounting members 81 is restricted, and the image reading unit 2 can be more stably disposed on the support structure 8. This support structure 8 is integrally secured to lateral sides of the paper feed unit 4 in such a way that securing screws (not shown) which are respectively inserted from outside into the through-holes 87 formed in each of the securing members 85 are respectively screwed into threaded holes formed in the corresponding one of the bottom end portions of the lateral sides of the paper feed unit 4.

In this manner, the support structure 8 is integrally secured to the lateral sides of the paper feed unit 4 via the securing members 85, whereby it is possible to obtain an advantage similar to that of the support structure 8 shown in FIG. 8. In addition, none of the members which constitute the support structure 8 are opposed to the back of the image forming unit 3 nor the back of the paper feed unit 4 except the bottom end portion of the paper feed unit 4. Accordingly, even in the case where projecting portions are formed on part of the back of the image forming unit 3 or on part of the back of the paper feed unit 4, the support structure 8 can support the image reading unit 2 in the state of allowing predetermined space above the top of the image forming unit 3. In addition, owing to the connecting members 82, it is similarly possible to achieve the advantage of protecting the connectors and the cables.

Each of the securing members 85 may has a construction in which spacer portions are respectively integrally formed on the portions of each of the securing members 85 that face the corresponding portions of the other and that define the respective through-holes 87, the opposing ones of the spacer portions being formed to project in directions toward each other. Otherwise, spacer pieces may be provided which are constructed separately from the securing members 85, and when the securing members 85 are respectively secured to the right and left sides of the paper feed unit 4, such spacer pieces may be interposed between the securing members 85 and the paper feed unit 4 to surround the respective through-holes 87.

Figure 10:
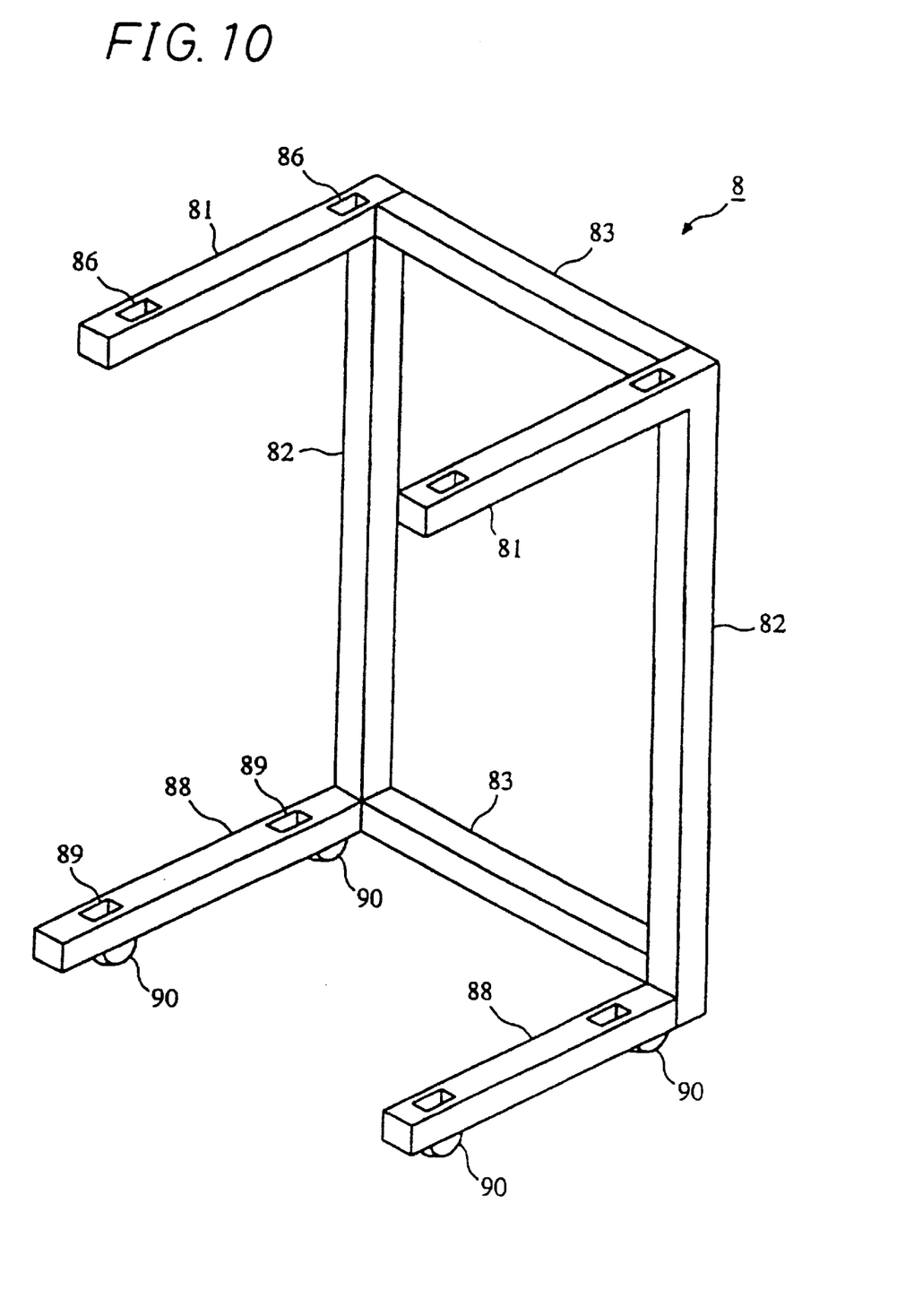
FIG. 10 is a perspective view showing the construction of a support structure of an image forming apparatus according to yet another embodiment of the invention.

FIG. 10 is a perspective view showing the construction of the support structure 8 of the image forming apparatus 1 according to yet another embodiment of the invention. In FIG. 10, identical reference numerals are used to denote portions which correspond to those of each of the embodiments shown in FIGS. 1 to 9, and only different portions will be described below. In the image forming apparatus 1 according to this embodiment, a pair of securing members 88 each of which has a rectangular cross section and whose top sides oppose the bottom of the paper feed unit 4 are provided in place of the securing members 85 in the construction shown in FIG. 9. The other portions are similar to those shown in FIG. 9. Fitting holes 89 are respectively formed at plural (in this example, two) forward and backward locations in the top side of each of the securing members 88, and casters 90 are rotatably supported at two forward and backward locations on the bottom side of each of the securing members 88. The total height of each of the securing members 88 that include the casters 90 is set to be lower than the ground clearance of the paper feed unit 4 (the height between the bottom of the paper feed unit 4 and a floor surface). Accordingly, the top sides of the securing members 88 are not brought into abutment with the bottom of the paper feed unit 4, and projecting pieces 47 which project from the bottom of the paper feed unit 4 are fitted from above into the respective fitting holes 89. The depth of each of the fitting holes 89 is greater than the length of each of the projecting pieces 47.

Figure 11:
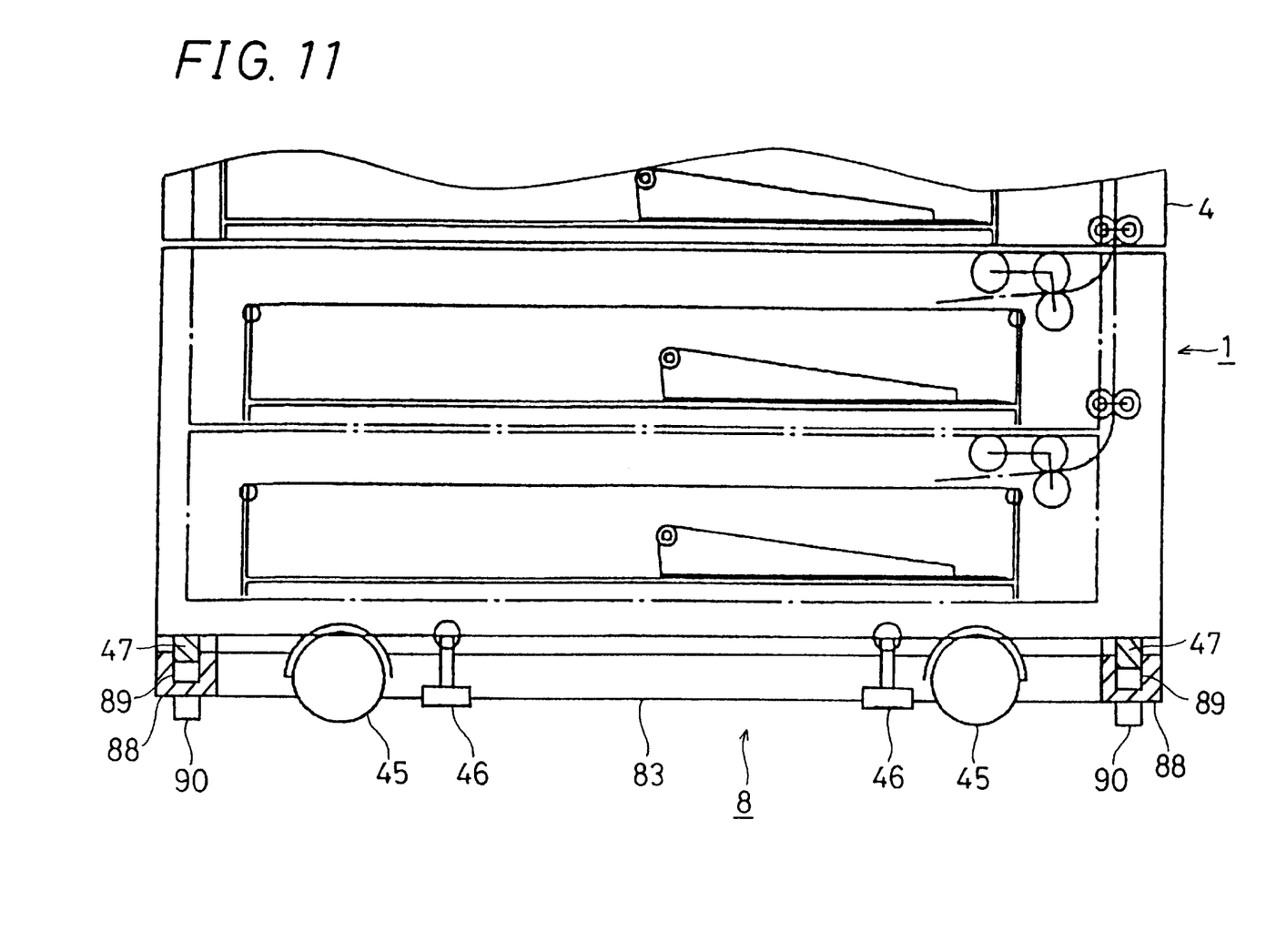
FIG. 11 is a cross-sectional view showing the state of engagement between the support structure 8 and the paper feed unit 4 in the image forming apparatus 1.

FIG. 11 is a cross-sectional view showing the state of engagement between the support structure 8 and the paper feed unit 4 in the image forming apparatus 1. The casters 90 each of which is disposed at the bottom of either of the securing members 88 of the support structure 8 are similar to the casters 45 which is disposed at the bottom of the paper feed unit 4. The support structure 8 is supported for movement with respect to a floor surface by the casters 90. During the state in which the abutment parts of the stands 46 of the paper feed unit 4 are in abutment with a floor surface and the casters 45 of the paper feed unit 4 are spaced apart from the floor surface, the length of each of the projecting pieces 47 is greater than the space between the bottom of the paper feed unit 4 and the top side of each of the securing members 88 so that the respective projecting pieces 47 of the bottom of the paper feed unit 4 are fitted into the fitting holes 89 of the securing members 88 of the support structure 8 during such state.

According to this construction, the securing members 88 are not opposed to any of the front, back and lateral sides of the image forming unit 3 or the paper feed unit 4, and owing to the fitting of the respective projecting pieces 47 into the fitting holes 89, the image reading unit 2 can integrally move together with the support structure 8 according to the horizontal movement of the image forming unit 3 and the paper feed unit 4 and the image reading unit 2 can be reliably prevented from falling off the image reading unit 2. In addition, since the securing members 88 are not brought into abutment with the bottom of the paper feed unit 4, the weights of the image forming unit 3 and the paper feed unit 4 are prevented from acting on the securing members 88, and the securing members 88 need not have a fully rigid structure. Accordingly, an increase in the weight of the support structure 8 and an increase in cost do not occur. In addition, owing to the connecting members 82, it is similarly possible to achieve the advantage of protecting the connectors and the cables. The state in which the respective projecting pieces 47 at the bottom of the paper feed unit 4 are fitted into the fitting holes 89 of the securing members 88 of the support structure 8 is set so that the respective projecting pieces 47 can easily be inserted into the fitting holes 89 and so that the support structure 8 can move integrally with the paper feed unit 4 when the paper feed unit 4 is made to move with respect to the floor surface.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:
   an image reading unit;
   a peripheral unit including an image forming unit disposed below the image
   a support structure for supporting the image reading unit spaced from a top of the peripheral unit, having a securing portion at which the support structure is integrally secured to a back side of the peripheral unit.

2. The image forming apparatus of claim 1, wherein the support structure has a vertically extending connecting-portion for supporting a mounting portion on which the image reading unit is mounted, in a vicinity of a top end thereof in a cantilevered manner, the securing portion being formed in a vicinity of a bottom end of the connecting portion.

3. An image forming apparatus comprising:
   an image reading unit;
   a peripheral unit including an image forming unit disposed below the image reading unit;
   a support structure for supporting the image reading unit spaced from a top of the peripheral unit, having a securing portion at which the support structure is integrally secured to the peripheral unit,
   wherein the securing portion vertically engages with a bottom of the peripheral unit.

4. An image forming apparatus comprising:
   an image reading unit;
   a peripheral unit including an image forming unit disposed below the image reading unit;
   a support structure for supporting the image reading unit spaced from a top of the peripheral unit, having a securing portion at which the support structure is integrally secured to the peripheral unit,
   the support structure has a vertically extending connecting-portion for supporting a mounting portion on which the image reading unit is mounted, in a vicinity of a top end thereof in a cantilevered manner, the securing portion being formed in a vicinity of a bottom end of the connecting portion,
   wherein the securing portion vertically engages with a bottom of the peripheral unit.

5. An image forming apparatus comprising:
   an image reading unit;
   a peripheral unit including an image forming unit disposed below the image reading unit;
   a support structure for supporting the image reading unit spaced from a top of the peripheral unit, having a securing portion at which the support structure is integrally secured to the peripheral unit,
   wherein the support structure is secured to a back of the peripheral unit via the securing portion at plural vertical positions of the support structure.

6. An image forming apparatus comprising:
   an image reading unit;
   a peripheral unit including an image forming unit disposed below the image reading unit;
   a support structure for supporting the image reading unit spaced from a top of the peripheral unit, having a securing portion at which the support structure is integrally secured to the peripheral unit,
   the support structure has a vertically extending connecting-portion for supporting a mounting portion on which the image reading unit is mounted, in a vicinity of a top end thereof in a cantilevered manner, the securing portion being formed in a vicinity of a bottom end of the connecting portion,
   wherein the support structure is secured to a back of the peripheral unit via the securing portion at plural vertical positions of the support structure.

7. An image forming apparatus comprising:
   an image reading unit;
   a peripheral unit including an image forming unit disposed below the image reading unit;
   a support structure for supporting the image reading unit spaced from a top of the peripheral unit, having a securing portion at which the support structure is integrally secured to the peripheral unit,
   wherein the support structure is secured to lateral sides of the peripheral unit via the securing portion at plural positions in a front and back direction of the supporting structure.

8. An image forming apparatus comprising:
   an image reading unit;
   a peripheral unit including an image forming unit disposed below the image reading unit;
   a support structure for supporting the image reading unit spaced from a top of the peripheral unit, having a securing portion at which the support structure is integrally secured to the peripheral unit,
   the support structure has a vertically extending connecting-portion for supporting a mounting portion on which the image reading unit is mounted, in a vicinity of a top end thereof in a cantilevered manner, the securing portion being formed in a vicinity of a bottom end of the connecting portion,
   wherein the support structure is secured to lateral sides of the peripheral unit via the securing portion at plural positions in a front and back direction of the supporting structure.

9. The image forming apparatus of claim 5, wherein the securing portion includes a spacer which is positioned between the back of the peripheral unit and the securing portion.

10. The image forming apparatus of claim 6, wherein the securing portion includes a spacer which is positioned between the back of the peripheral unit and the securing portion.

11. The image forming apparatus of claim 7, wherein the securing portion includes a spacer which is positioned between the securing portion and the lateral side of the peripheral unit.

12. The image forming apparatus of claim 8, wherein the securing portion includes a spacer which is positioned between the securing portion and the lateral side of the peripheral unit.

13. The image forming apparatus of claim 1, wherein the peripheral unit includes:
   a paper feed unit for accommodating paper therein; and
   an image forming unit which is disposed above the paper feed unit, for forming an image on paper, and
   the support structure is integrally secured to the backside of the paper feed unit.

14. An image forming apparatus comprising:
   an image reading unit;
   a peripheral unit including an image forming unit disposed below the image reading unit;
   a support structure for supporting the image reading unit spaced from a top of the peripheral unit, having a securing portion at which the support structure is integrally secured to the peripheral unit,
   wherein the peripheral unit includes:
   a caster provided with a roller capable of rolling; and a stand displaceable between a position where the stand projects from the caster and a position where the stand is retracted from the caster.

* * * * *